United States Patent
Lu et al.

(10) Patent No.: US 11,665,310 B2
(45) Date of Patent: May 30, 2023

(54) AMBIENT LIGHT SENSOR WINDOWS FOR ELECTRONIC DEVICES COMPRISING AN OPTICAL SENSOR WITHIN AN OPENING IN THE LOCALLY THINNED AREA OF AN OPAQUE LAYER

(71) Applicant: Apple Inc., Cupertino, CA (US)

(72) Inventors: Dawei Lu, Cupertino, CA (US);
Kenneth J. Vampola, Los Altos, CA (US); Peter Jeziorek, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/690,904

(22) Filed: Mar. 9, 2022

(65) Prior Publication Data
US 2022/0201240 A1   Jun. 23, 2022

Related U.S. Application Data

(63) Continuation of application No. 16/428,635, filed on May 31, 2019, now Pat. No. 11,290,677.

(51) Int. Cl.
*H04N 5/58* (2006.01)
*G06F 3/041* (2006.01)
*G06F 3/042* (2006.01)

(52) U.S. Cl.
CPC .............. *H04N 5/58* (2013.01); *G06F 3/042* (2013.01); *G06F 3/0414* (2013.01)

(58) Field of Classification Search
CPC .......... H04N 5/58; H04N 5/64; G06F 3/0414; G06F 3/042; G06F 1/1637; G06F 2200/1612; G06F 2200/1631; G06F 1/1601; G06F 2203/04103; G09G 2320/0626; G09G 2360/144; G09G 3/20; G09G 5/10; G02F 1/133331; G02F 1/133512; G02F 1/13318
USPC .......................................... 250/239, 221, 216
See application file for complete search history.

(56) References Cited

U.S. PATENT DOCUMENTS

| | | |
|---|---|---|
| 7,864,136 B2 | 1/2011 | Matthies et al. |
| 8,081,169 B2 | 12/2011 | Lin et al. |
| 8,305,400 B2 | 11/2012 | Otani et al. |
| 8,357,977 B2 | 1/2013 | Kaigawa |

(Continued)

FOREIGN PATENT DOCUMENTS

CN 208424468 U 1/2019

*Primary Examiner* — Que Tan Le
(74) *Attorney, Agent, or Firm* — Treyz Law Group, P.C.; Jason Tsai

(57) ABSTRACT

An electronic device has pixels that form an active area of a display for displaying images for a user. A layer of black ink or other opaque material may be formed on an inner surface of a display cover layer in an inactive area of the display that does not overlap pixels. The housing may have sidewalls such as a rear housing wall that faces away from the display. Ambient light sensor windows may be formed from tapered holes or other holes. The tapered holes may be formed in the opaque material on the display cover layer, may be formed in a rear housing wall or other hosing structure, or may be formed in other portions of the electronic device. Non-tapered holes may also form windows. Tapered holes may have sidewalls with portions that run parallel to their longitudinal axes and portions that are angled relative to their longitudinal axes.

22 Claims, 7 Drawing Sheets

(56) References Cited

U.S. PATENT DOCUMENTS

| | | |
|---|---|---|
| 8,570,288 B2 | 10/2013 | Lai et al. |
| 9,336,749 B2 | 5/2016 | Vetsuypens et al. |
| 10,120,515 B1 | 11/2018 | Ghali et al. |
| 10,146,090 B2 | 12/2018 | Siddiqui et al. |
| 2005/0218303 A1 | 10/2005 | Poplin |
| 2007/0200055 A1 | 8/2007 | Reznik et al. |
| 2008/0024470 A1* | 1/2008 | Andre .................... H01H 13/83 |
| | | 345/204 |
| 2008/0204437 A1 | 8/2008 | Jensen |
| 2009/0040703 A1 | 2/2009 | Gotham et al. |
| 2010/0078562 A1 | 4/2010 | Dinh et al. |
| 2010/0273530 A1 | 10/2010 | Jarvis et al. |
| 2012/0170284 A1 | 7/2012 | Shedletsky |
| 2014/0118826 A1 | 5/2014 | Jiao et al. |
| 2014/0166867 A1 | 6/2014 | Shiu et al. |
| 2014/0225131 A1* | 8/2014 | Benson ................. G06F 1/1686 |
| | | 257/82 |
| 2015/0102212 A1* | 4/2015 | Ruh .................... H01L 31/0203 |
| | | 250/237 R |
| 2016/0372053 A1 | 12/2016 | Lee et al. |
| 2017/0229059 A1* | 8/2017 | Bonnier ................. G06F 3/017 |
| 2017/0271427 A1* | 9/2017 | Nakajima ............. H01L 27/322 |
| 2017/0322133 A1 | 11/2017 | Trainer |
| 2018/0260602 A1* | 9/2018 | He .................... A61B 5/14542 |
| 2019/0080668 A1 | 3/2019 | Holenarsipur et al. |
| 2019/0098748 A1* | 3/2019 | Guo ..................... G06F 1/1688 |
| 2019/0301932 A1 | 10/2019 | Sarkar et al. |

* cited by examiner

AMBIENT LIGHT SENSOR WINDOWS FOR ELECTRONIC DEVICES COMPRISING AN OPTICAL SENSOR WITHIN AN OPENING IN THE LOCALLY THINNED AREA OF AN OPAQUE LAYER

This application is a continuation of U.S. patent application Ser. No. 16/428,635, filed May 31, 2019, which is hereby incorporated by reference herein in its entirety.

FIELD

This relates generally to electronic devices, and, more particularly, to electronic devices with optical components such as light sensors.

BACKGROUND

Electronic devices may have optical components such as light sensors. For example, electronic devices may have ambient light sensors for measuring ambient light levels. During operation of an electronic device with an ambient light sensor, display characteristics such as display brightness and color cast can be adjusted based on ambient light intensity and color measurements.

It can be challenging to incorporate an ambient light sensor into an electronic device. If care is not taken, the presence of an ambient light sensor may adversely affect a device's appearance or an ambient light sensor may not gather ambient light readings accurately.

SUMMARY

An electronic device may have a housing with a display. The housing may be supported on a desktop by a stand or may have other configurations. The display may have a display cover layer that overlaps an array of pixels. The array of pixels may form an active area of the display that displays images for a user.

A layer of black ink or other opaque material may be formed on an inner surface of the display cover layer in an inactive area of the display that does not overlap pixels. The housing may have walls such as a rear housing wall that faces away from the display.

Ambient light sensor windows may be formed in the device to allow ambient light from the exterior region surrounding the device to reach ambient light sensors in the interior of the device. Ambient light sensor windows may be formed on opposing front and rear sides of the device or other suitable locations on the device.

Ambient light sensor windows may be formed from tapered holes or other holes. The tapered holes may be formed in the opaque material on the display cover layer, may be formed in a rear housing wall or other housing structure, or may be formed in other portions of the electronic device. Non-tapered holes may also be used in forming ambient light sensor windows. In some configurations, tapered and/or non-tapered holes in opaque structures in a device may be used in forming optical component windows for components other than ambient light sensors.

DETAILED DESCRIPTION

An electronic device may have optical components. The optical components may operate through transparent portions of a device that serve as optical component windows and that allow light to pass between the exterior and interior of the device. The optical components may include, for example, light sensors such as ambient light sensors.

Ambient light sensors may be used to gather measurements of ambient light intensity and color. During operation of an electronic device, display adjustments may be made and other actions may be taken based on ambient light sensor measurements. For example, display characteristics such as display brightness and/or display color cast may be adjusted based on measurements of ambient light intensity and/or ambient light color.

Optical component windows are sufficiently transparent to allow light to pass from the interior of the electronic device to the exterior of the electronic device and to allow light to pass from the exterior of the electronic device to the interior. For example, an ambient light sensor window is sufficiently transparent to allow visible light from the exterior of an electronic device to pass to an ambient light sensor in the interior that is aligned with the ambient light sensor window.

Ambient light sensor windows may be formed within opaque structures in an electronic device such as within opaque border regions in a display or within opaque housing wall structures. To ensure that the ambient light sensor windows are sufficiently transparent, the opaque structures may be provided with holes. The holes may, as an example, allow light to pass from the exterior of the device through the opaque structures to an ambient light sensor in the interior of the device.

Figure 1:
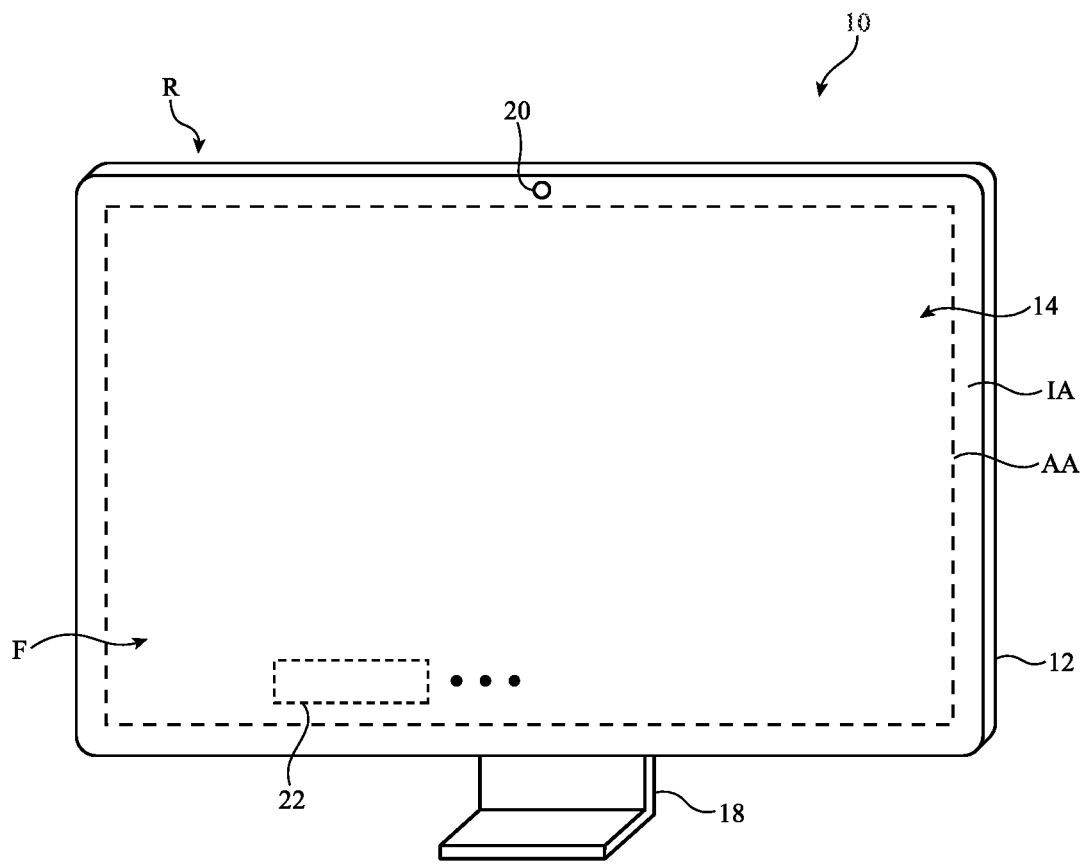
FIG. 1 is a perspective view of an illustrative electronic device in accordance with an embodiment.

A perspective view of an illustrative electronic device with optical component windows such as ambient light sensor windows is shown in FIG. 1. Electronic device 10 may have a display such as display 14 mounted in a housing such as housing 12. Device 10 of FIG. 1 is a desktop device (e.g., a desktop computer, stand-alone display, or other desktop equipment) that is supported by stand 18 on a support surface such as a desktop. Other types of electronic devices may be provided with ambient light sensor windows if desired. Electronic device 10 may be, for example, a computing device such as a laptop computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a display, a gaming device, a navigation device, an embedded system such as a system mounted in a kiosk or automobile, or other electronic equipment.

Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose an interior region within device 10 and may separate the interior region from an exterior region surrounding device 10. The housing walls may include a rear wall on rear side (surface) R of device 10, opposing front side (surface) F of device 10.

Display 14 may be a liquid crystal display, an organic light-emitting diode display, or other suitable display. Display 14 may be covered with a transparent display cover layer that covers sensitive display circuitry. The display cover layer may be formed from glass, crystalline material such as sapphire, clear polymer, other transparent materials, and/or combinations of these materials. The display cover layer may be coupled to metal housing walls or other housing structures and may sometimes be referred to as forming transparent housing structures or a transparent housing wall.

The display cover layer may overlap active area AA of display 14 on front side F of device 10. Active area AA may include an array of pixels that display an image for viewing by a user of device 10. One or more portions of the display cover layer may also overlap inactive display areas such as inactive area IA. Inactive area IA may contain display driver circuitry and other components, but does not include pixels and does not display images. Inactive area IA may, as an example, form a pixel-free border for active area AA that runs along four peripheral edges of device 10.

A layer of opaque material (e.g., black ink formed from black dye and/or black particles in a polymer or other opaque materials in polymer) may be formed as a coating on an inner surface of the display cover layer in inactive area IA. This opaque coating layer, which may sometimes be referred to as an opaque masking layer, black ink layer, opaque ink layer, etc., may be black, white, gray, silver, or other neutral colors or may have a non-neutral color (e.g., red, blue, yellow, etc.). In some configurations, the opaque coating layer may be formed from multiple sublayers. The opaque coating layer may be visible from the exterior of device 10 (e.g., through peripheral portions of the display cover layer). Due to the presence of the opaque coating layer in inactive area IA, display driver circuitry and other components in inactive area IA may be hidden from view from the exterior of device 10.

Ambient light sensor windows for device 10 may be mounted within opaque portions of device 10 such as within an opaque portion of housing 12 on rear side R, within opaque sidewall portions of housing 12, and/or within the opaque coating on the inner surface of the display cover layer in inactive area 14 on front side F. As an example, ambient light sensor 20 may be mounted along the upper peripheral edge of device 10 in inactive area IA, as shown in FIG. 1.

Electrical components 22 may be mounted in the interior of device 10 (e.g., between the cover layer that covers display 14 on front side F and an opposing rear housing wall on rear side R). Components 22 may include integrated circuits, discrete components, light-emitting components, sensors, and/or other circuits. Electrical components 22 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output, to transmit signals to external equipment, to adjust display 14, and/or to perform other tasks. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 22.

Input-output circuitry in components 22 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 22) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, ultrasonic sensors, optical touch sensors, optical proximity sensors, and/or other touch sensors and/or proximity sensors, monochromatic and color ambient light sensors such as ambient light sensor 20, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 22 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 22 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Ambient light sensor windows and other optical component windows in device 10 transmit sufficient light to allow aligned optical components to receive or emit light. For example, ambient light sensors that are overlapped by ambient light sensor widows may gather ambient light measurements. The transmission of an ambient light sensor window may be, for example, at least 0.5%, at least 1%, at least 2%, at least 10%, at least 50%, less than 100%, less than 60%, less than 20%, or other suitable value. In an illustrative configuration, the light that passes through an ambient light sensor window passes mostly or entirely through holes that are formed within an opaque material (e.g., a metal housing layer or a housing wall of other opaque material, an opaque layer in an inactive portions of a display, etc.). The holes may be air-filled holes or the holes may be filled with clear material such as clear polymer that does not affect the spectrum of the light passing through the holes.

Figure 2:
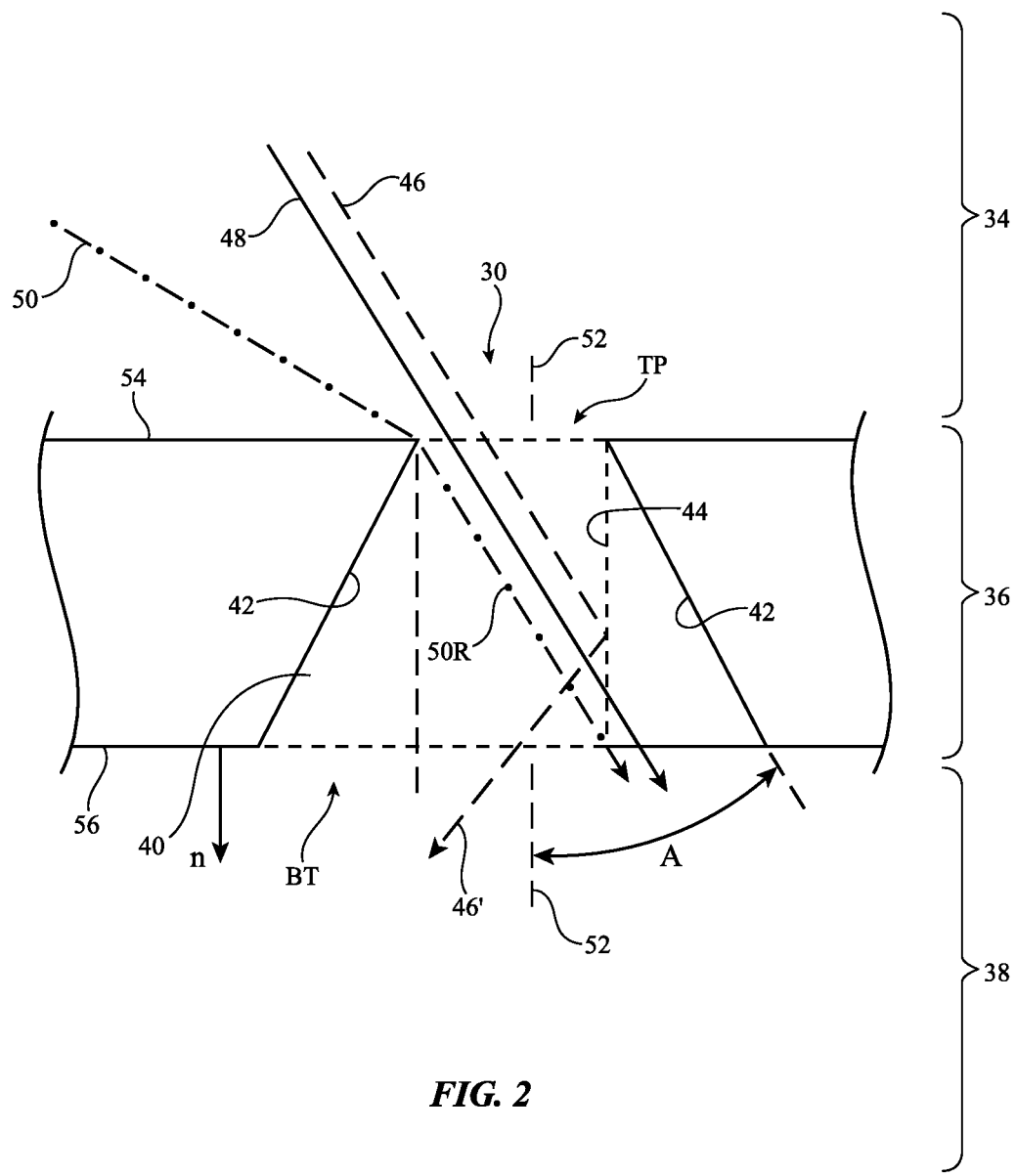
FIG. 2 is a cross-sectional side view of an illustrative opaque layer with tapered holes for forming an optical component window such as a light sensor window in accordance with an embodiment.

A cross-sectional side view of an illustrative hole for an ambient light sensor window (or other optical component window) is shown in FIG. 2. As shown in FIG. 2, a through hole such as hole 30 may be formed in opaque structure 36. Opaque structure 36 may be a coating of opaque masking material (e.g., a layer of black ink or other opaque ink on a display cover layer), a housing wall (e.g., a housing wall formed from a layer of metal or opaque polymer), an opaque layer formed from other materials and/or multiple layers of these material, and/or other opaque structures in device 10.

Hole 30 may separate region 34 from region 38. Region 38 may be in the interior of device 10 (e.g., in the interior of housing 12). An ambient light sensor may be located in region 38 in alignment with an ambient light sensor window formed from an array of multiple holes such as hole 30. Region 34 may encompass the exterior region surrounding device 10 and may include housing walls, a display cover layer, and/or other device structures that separate the exterior region from the interior of device 10. One or more ambient light sources such as the sun, interior and/or exterior lighting, and other sources of light (e.g., visible light) may be located in the exterior region and may produce light rays such as illustrative light rays 46, 48, and 50.

Hole 30 may have tapered sidewalls such as sidewalls 42. Hole 30 may be conical (frustoconical) and may be rotationally symmetric about longitudinal axis 52 and/or may have other shapes. Sidewalls 42 may be tilted away from axis 52 and may therefore be characterized by a surface normal that is not perpendicular to axis 52. Opaque layer 36 may be characterized by outwardly facing (outer) surface 54 and opposing inwardly facing (inner) surface 56. When a tapered hole shape is used for hole 30, hole 30 has a first outwardly facing (outer) opening TP in surface 54 (sometimes referred to as a light entrance opening) and a second larger inwardly facing (inner) opening BT in surface 56 (sometimes referred to as a light exit opening). Openings TP and BT may have circular outlines (footprints when viewed from above) or other suitable shapes.

Hole 30 may be filled with clear material 40 (e.g., clear polymer) or may be filled with air. In the absence of the tapered shape of hole 30, incoming ambient light rays such as illustrative ambient light ray 46 might reflect off of vertical hole sidewall surfaces such as surface 44 as shown by reflected ray 46' and might be spectrally altered by the reflection spectrum associated with layer 36. This could degrade color accuracy for ambient light measurements. The intensity of light may also be reduced due to reflection off of vertical hole sidewall surfaces, which could degrade brightness accuracy for ambient light measurements.

In the presence of tapered sidewalls 42, however, incoming ambient light rays such as illustrative light ray 48 will not strike sidewalls 42 before being detected by the ambient light sensor in region 38. This enhances color and brightness accuracy. In the presence of clear polymer or other solid materials having an index of refraction greater than that of air (e.g., greater than 1), incoming light rays are refracted. Consider, as an example, incoming ambient light ray 50, which is refracted towards surface normal n of surface 56 to form refracted light ray 50R in the presence of clear filler such as polymer 40 having a refractive index greater than 1. Due to the refraction process when polymer 40 is present, the maximum angle of incoming light rays that do not strike sidewall 42 when polymer 40 is present such as illustrative light ray 50 is greater than the maximum angle of incoming light rays that do not strike sidewall 42 when polymer 40 is not present. The inclusion of polymer 40 may therefore help enhance range of angles over which incoming light can be accurately measured. In the example of FIG. 2, air is present in region 34 above holes 30, but the range of angles over which incoming light can be accurately measured will likewise be enhanced in scenarios in which a layer of clear polymer or glass is present between holes 30 and the exterior of device 10. The behavior of the incoming light rays in FIG. 2 is illustrative.

Figure 3:
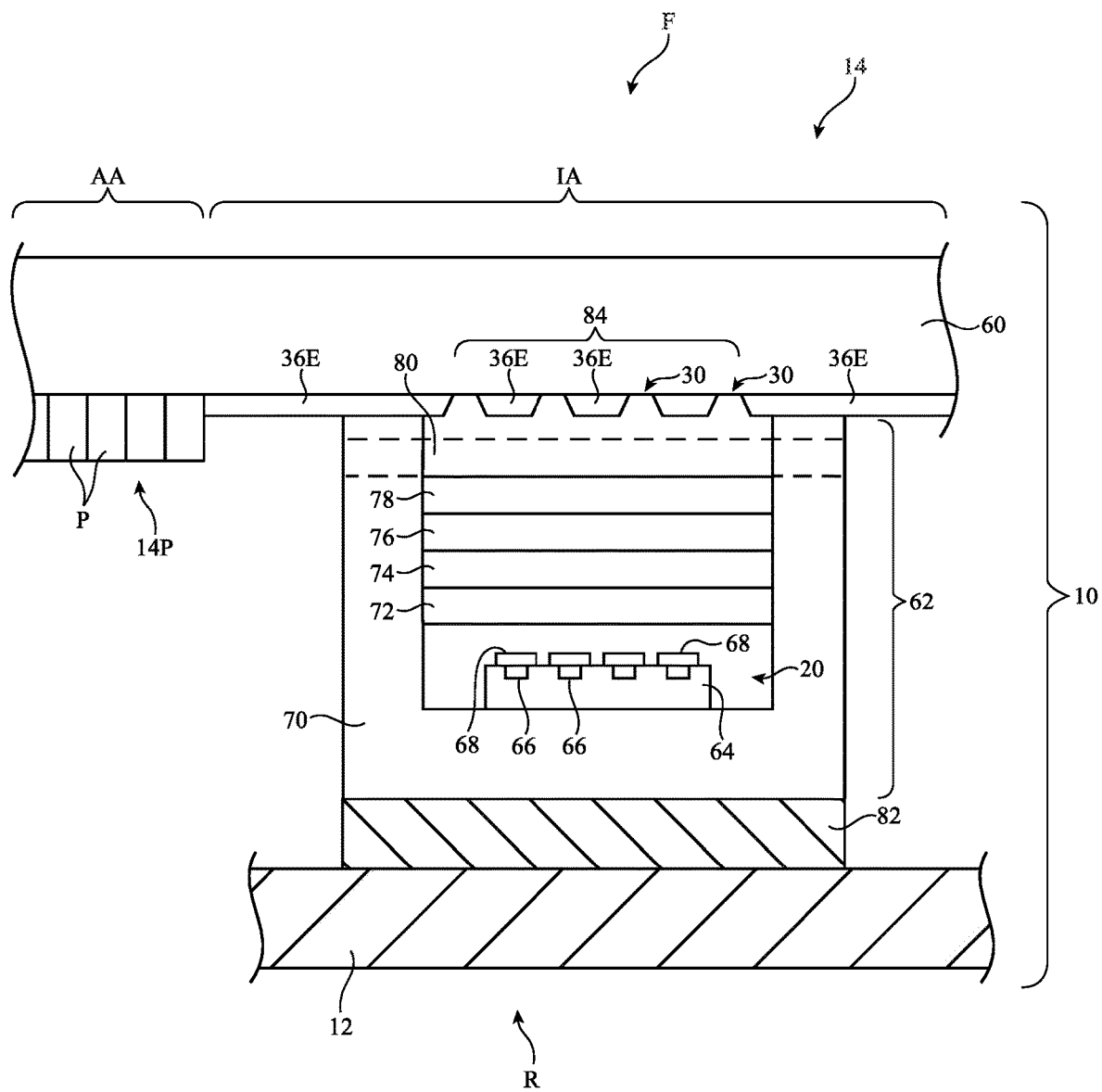
FIG. 3 is a cross-sectional side view of illustrative ambient light sensor window formed from tapered holes in an opaque layer on a display cover layer in accordance with an embodiment.

FIG. 3 is a cross-sectional side view of an illustrative ambient light sensor window and associated ambient light sensor in device 10. In the example of FIG. 3, ambient light sensor 20 has been formed from a semiconductor die 64 (e.g., a silicon die) with multiple photodetectors 66. Each photodetector 66 may have a corresponding color filter 68 through which light passes before reaching that photodetector. Color filters 68 may be formed from colored polymer layers or other materials that pass particular bands of wavelengths (e.g., different colors of light) and/or may be formed from thin-film interference filters with different pass bands. As an example, color filters 68 may include a first color filter that passes red light, a second color filter that passes blue light, and additional color filters that pass light of different colors. With this type of arrangement, different photodetectors 66 detect light of different colors. A multichannel light sensor such as sensor 20 of FIG. 3 may therefore measure the relative contribution of each color of light that is present and may therefore serve as a color ambient light sensor that measures both the total light intensity of ambient light and ambient light color. Ambient light color measurements may be gathered as color coordinates, a color temperature, a correlated color temperature, a light spectrum, or as color measurement data represented using other color measurement formats. There may be, for example, at least 3, at least 6, at least 10, fewer than 20, fewer than 9, or other suitable number of photodetectors 66 on die 64.

Ambient light sensor 20 may be mounted within ambient light sensor assembly 62. Assembly 62 may have housing and support structures such as housing 70 (e.g., structures formed from polymer and/or other materials that support ambient light sensor die 64 in alignment with ambient light sensor window 84). A compressible structure such as a spring or other biasing member (e.g., foam layer 82) may be interposed between a support structure (e.g., housing 12) and the lower surface of housing 70 to bias housing 70 and ambient light sensor 20 against the inwardly facing surface of display cover layer 60.

Assembly 62 may support filter layers, light diffuser layers, and other optical components between ambient light sensor window 84 and ambient light sensor 20. These layers may include, as an example, one or more infrared-light-blocking filters such as filters 72 and 74. Filter 72 may be a polymer infrared cut filter, an ultraviolet cut filter, or a filter that blocks ultraviolet and infrared light while passing visible light. Filter 74 may be a thin-film interference filter that blocks infrared light, a thin-film interference filter that blocks ultraviolet light, or a thin-film interference filter that blocks both infrared and ultraviolet light while passing visible light. One or more diffuser layers such as first diffuser 76, second diffuser 78, and optional third diffuser 80 (e.g., a film of 300-900 microns in thickness or other suitable thickness) may help diffuse incoming ambient light and thereby prevent hotspots in the ambient light reaching ambient light sensor 20. Optional diffuser 80 may rest on top of housing 70 or may be omitted. An air gap (e.g., an air gap of tens of microns in size) may separate the diffusers from holes 30 in ambient light sensor window 84. Optional air gaps may also be formed between respective diffuser layers and/or other layers, if desired.

Ambient light sensor window 84 may have a circular outline or other suitable shape. Window 84 may, as an example, have a circular shape with a diameter of 2.8 mm, at least 0.5 mm, at least 1 mm, at least 2 mm, at least 4 mm, less than 10 mm, less than 4 mm, less than 3 mm, less than 1.5 mm, or other suitable size. There may be multiple ambient light sensor windows such as window 84 in device 10. In the example of FIG. 3, a single window 84 has been formed in an opaque coating such as opaque coating layer 36F. Opaque coating layer 36F is formed on the inner surface of display cover layer 60 in inactive area IA. In active area AA of display 14, pixels P of display panel 14P for display 14 display images for viewing by a user through display cover layer 60.

Figure 4:
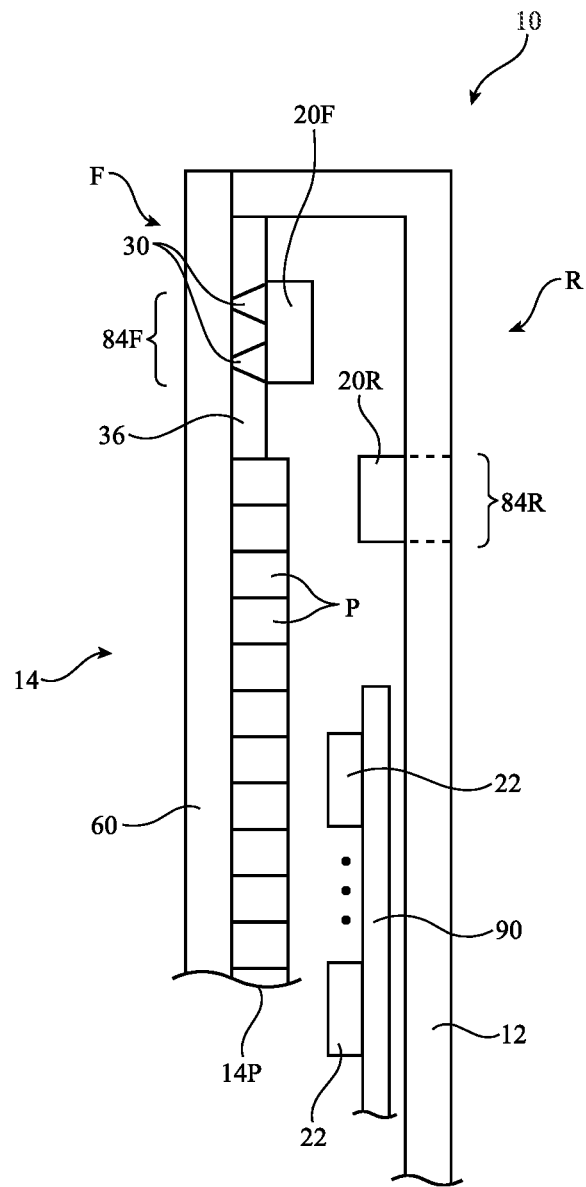
FIG. 4 is a cross-sectional side view of an illustrative electronic device with front and rear light sensors in accordance with an embodiment.

If desired, device 10 may have multiple ambient light sensors 20. Consider, as an example, the illustrative arrangement of FIG. 4. As shown in FIG. 4, display 14 of device 10 may be mounted in housing 12 on front side F. Display cover layer 60 may overlap an array of pixels P in display panel 14P. The array of pixels forms a display active area that displays images for a user that are visible through display cover layer 60. In the inactive area of display 14, opaque coating layer 36F is formed on the inner surface of display cover layer 60. An array of openings 30 in layer 36F forms ambient light sensor window 84. Front-facing ambient light sensor 20F may be aligned with a front-facing ambient light sensor window such as ambient light sensor window 84 to receive ambient light from the front of device 10.

Housing 12 may have a metal housing wall or a housing wall formed from other materials on rear side R facing away from the interior of device 10 and away from display 14. A rear-facing ambient light sensor such as ambient light sensor 20R may receive ambient light from the rear of device 10 through a rear-facing ambient light sensor window such as rear-facing ambient light sensor window 84R. Rear ambient light sensor window 84R may be formed from one or more holes (e.g., tapered holes and/or non-tapered holes) in housing 12 and/or may be formed using other ambient light sensor window configurations. The diameter of this hole (or holes) may be 100-400 microns, at least 50 microns, less than 2 mm, or other suitable size. Electrical components 22 in the interior of device 10 may be interconnected by signal paths such as signal paths on one or more printed circuits such as printed circuit 90.

With an arrangement of the type shown in FIG. 4, the control circuitry of device 10 may make display intensity and color adjustments and/or may take other actions based on ambient light sensor measurements taken to the front and rear of device 10. Weighting functions or other combining operations may be used to produce desired intensity and color adjustments based on ambient light measured in front of device 10 and ambient light measured to the rear of device 10. For example, the control circuitry of device 10 may be configured to use the brightest reading, to use an average of the front and rear readings, to use a weighted average of the front and rear readings, etc. In an illustrative configuration, the control circuitry may increase the brightness of images displayed on display 14 in bright lighting conditions and can decrease display brightness when ambient lighting is dim. In warm lighting conditions, the color cast of display 14 (e.g., the display's white point) can be shifted warmer and in cold lighting conditions, the color cast of display 14 can be shifted colder. Display brightness may also be adjusted based on ambient light color measurements and/or display color cast may be adjusted based on ambient light intensity measurements, if desired.

Figure 5:
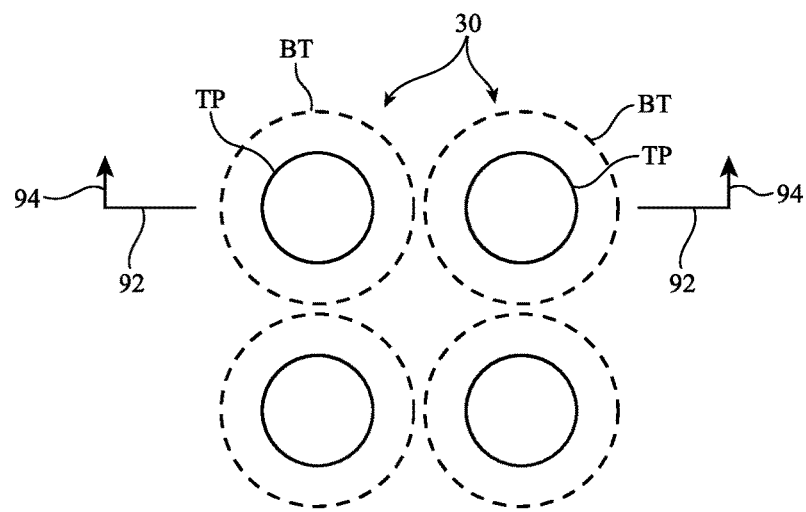
FIG. 5 is a plan view of illustrative tapered holes for an ambient light sensor window in accordance with an embodiment.
Figure 6:
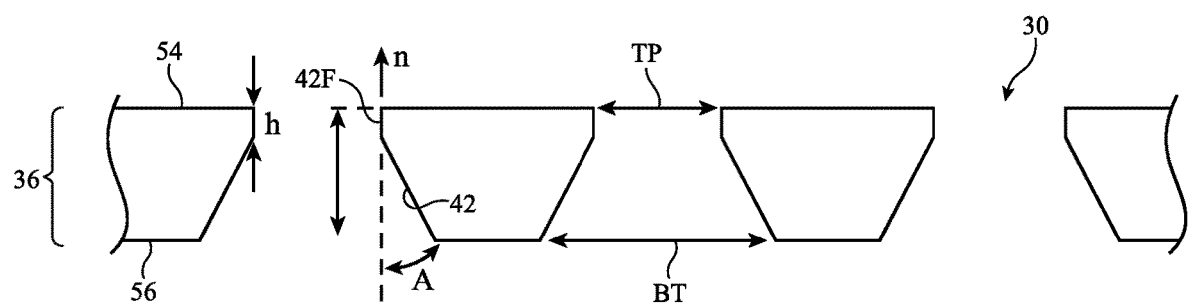
FIG. 6 is a cross-sectional side view of the illustrative holes of FIG. 5 in accordance with an embodiment.

Ambient light sensor windows in layer 36F, housing 12, and/or other opaque layers 36 can use arrays of holes such as circular tapered holes 30. A plan view of an illustrative set of ambient light sensor window holes is shown in FIG. 5. As shown in the example of FIG. 5, outwardly facing openings TP of holes 30 may have smaller diameters than inwardly facing openings BT of holes 30. FIG. 6 is a cross-sectional side view of holes 30 of FIG. 5 taken along line 92 and viewed in direction 94. As shown in FIG. 6, holes 30 of FIG. 5 are spaced sufficiently far apart that openings BT do not overlap each other.

Device 10 may have opaque structures such as opaque Layer 36 may be formed from any suitable opaque material (s).

In an illustrative configuration, layer 36 is formed from screen printed opaque ink (e.g., black ink) having a thickness T of 300 microns, 50-100 microns, 100-300 microns, at least 5 microns, 5-10 microns, at least 10 microns, at least 30 microns, at least 50 microns, at least 150 microns, less than 9 mm, less than 3 mm, less than 600 microns, less than 350 microns, less than 100 microns, less than 50 microns, less than 40 microns, or other suitable thickness. The diameters of outwardly facing openings TP may be small enough to be invisible to a user's naked eye (e.g., less than 30 microns or other suitable diameter), may be 16-26 microns, may be at least 3 microns, at least 16 microns, at least 20 microns, at least 25 microns, less than 30 microns, less than 125 microns, or other suitable size. The surface of sidewall 42 may lie at a non-zero and non-perpendicular angle A with respect to longitudinal axis 52 (and to surface normal n of outer surface 54 and inner surface 56). The diameters of inwardly facing openings BT may be 200-600 microns, at least 20 microns, at least 50 microns, at least 300 microns, less than 6 mm, less than 4 mm, less than 3 mm, less than 1000 microns, or other suitable size.

In another illustrative configuration, layer 36 may be a metal housing wall or a housing wall formed from one or more materials (metal, polymer, and/or other materials). For example, layer 36 may form a rear housing wall and holes 30 may form rear ambient light sensor window 84R for passing light to rear ambient light sensor 20R. In this type of arrangement, angle A of tapered openings 30 may be about 30-70°, at least 10°, at least 20°, at least 30° at least 40°, at least 60°, less than 89°, less than 80°, less than 70°, less than 50°, less than 40°, 30-40°, 1-30°, 40-60°, or other suitable value. Openings TP and BT may have diameters of at least 10 microns, at least 100 microns, at least 1 mm, at least 10 mm, less than 5 mm, less than 500 microns, less than 50 microns, less than 25 microns, less than 30 microns, 16-26 microns, or other suitable size.

Sidewalls 42 may be tapered and may run between outer surface 54 and inner surface 56. In some configurations, portions of sidewalls 42 may run vertically (e.g., parallel to surface normal n), as illustrated by surface portions 42F of FIG. 6. The size (height h parallel to surface normal n) of surface portions 42F may be about 30 microns, at least 3 microns, less than 300 microns, or other suitable size (e.g., about 5-15% of thickness T of layer 36, at least 1% of thickness T, less than 50% of thickness T, etc.). The use of a straight (non-tapered) upper portion in hole 30 such as the portion formed by non-tapered sidewall portions 42F may help reduce burs and other undesired features in holes 30 and may help ensure that holes 30 may be formed in a controllable manner.

Laser drilling, mechanical drilling, photolithography, printing, and/or other techniques may be used in forming holes 30. As an example, a straight drill may be used in forming the non-tapered portion of holes 30 and an angled router bit may be used in forming the tapered sidewalls of holes 30 (e.g., the angled router bit may be used in a single vertical application or may be moved in a circular pattern around the perimeter of holes BT).

Figure 7:
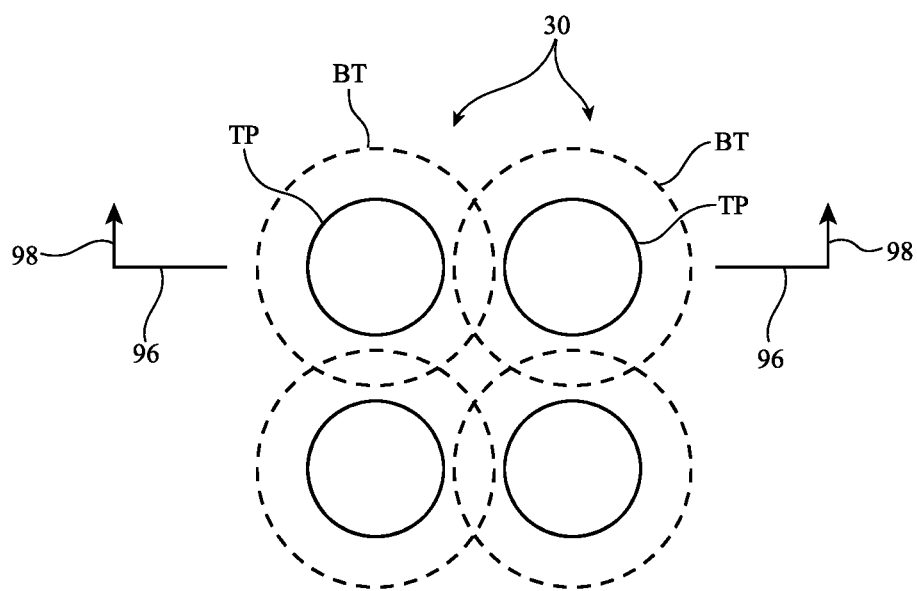
FIG. 7 is a plan view of additional illustrative tapered holes for an ambient light sensor window in accordance with an embodiment.
Figure 8:
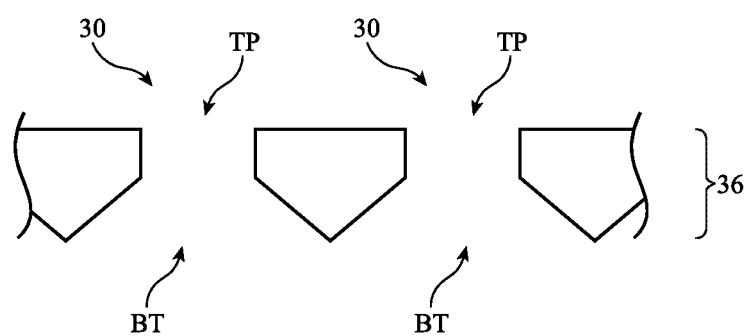
FIG. 8 is a cross-sectional side view of the illustrative holes of FIG. 7 in accordance with an embodiment.

If desired, holes 30 may be placed closer together. As shown in FIG. 7, for example, holes 30 may be arranged so that portions of bottom openings BT for holes 30 overlap with portions of bottom openings BT for adjacent holes 30. FIG. 8 is a cross-sectional side view of holes 30 of FIG. 7 taken along line 96 and viewed in direction 98, showing how bottom openings BT overlap with each other.

Figure 9:
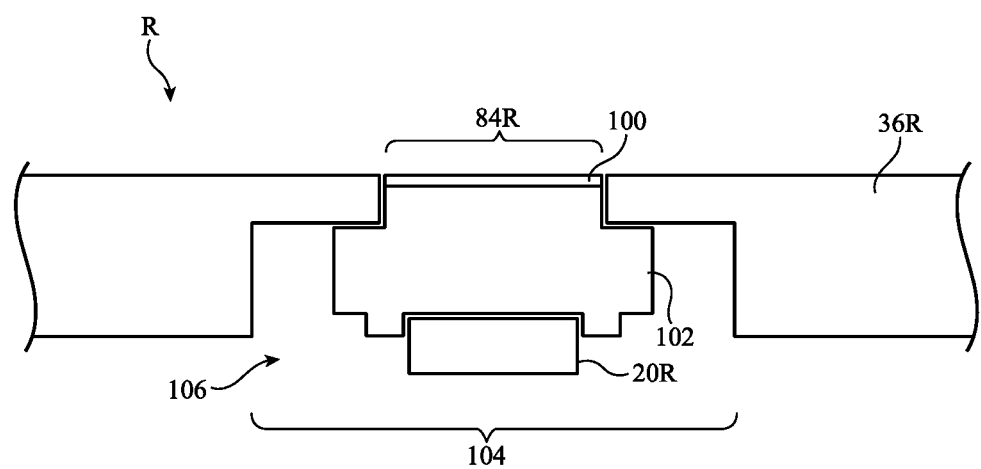
FIG. 9 is a cross-sectional side view of an illustrative optical component window such as an ambient light sensor window in accordance with an embodiment.

In addition to forming ambient light sensor windows from an array of tapered openings such as openings 30, ambient light sensor windows may, if desired, be formed from single openings in opaque structures. Consider, as an example, the illustrative configuration for rear ambient light sensor window 84R of FIG. 9. In this example, opaque layer 36R is formed from a metal housing wall, other layer(s) of housing 12, and/or other opaque structures in device 10. An area of layer 36R may be locally thinned, as illustrated by thinned area 104. This thinned area may receive ambient light sensor assembly 106. Ambient light sensor assembly 106 may include diffusers, infrared cut filters, ultraviolet cut filters, filters that block both ultraviolet and infrared light, and/or other optical components. As an example, ambient light sensor assembly 106 may include a clear structure such as ultraviolet-light-absorbing member 102 which is received in a through-hole opening formed in layer 36R. Member 102 may be formed from glass, polymer, or other materials and may optionally include one or more layers of optical components (e.g., filters, diffusers, etc.). As shown in FIG. 9, an outwardly facing coating such as coating layer 100 may be provided on the outer surface of member 102. Coating layer 100 may be sufficiently transparent to pass ambient light from the exterior of device 10 to ambient light sensor 20R while having an appearance that is matched to the appearance of surrounding portions of layer 36R. For example, if layer 36R is formed from a rear aluminum housing wall in housing 12, layer 100 may be formed from gray ink.

In addition to or instead of using tapered holes 30 and, if desired, windows of the type shown in FIG. 9 for forming ambient light sensor windows, these window arrangements may serve as optical component windows for other optical components in device 10 (e.g., light-emitting devices such as light-emitting diodes and/or lasers, light detecting devices such as infrared light sensors, ultraviolet light sensors, and/or visible light sensors, light-emitting devices that are used in forming the sensors of device 10, cameras, proximity sensors, distance sensors, three-dimensional sensors, and/or other optical components). The use of windows such as windows 84 and 84R in forming ambient light sensor windows is illustrative.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

| Table of Reference Numerals | | | |
|---|---|---|---|
| 10 | Electronic Device | 12 | Housing |
| 14 | Display | 14P | Display panel |
| 18 | Stand | 20 | Ambient Light Sensor |
| 20F | Front-Facing Ambient Light Sensor | 20R | Rear Ambient Light Sensor |
| 22 | Electrical components | 30 | Hole |
| 34 | Separate Region | 36 | Opaque Structure |
| 36F | Opaque coating layer | 36R | Opaque layer |
| 38 | Region | 40 | Polymer |
| 42 | Sidewalls | 42F | Surface portions |
| 44 | Surface | 46 | Light ray |
| 46' | Reflected ray | 48 | Light ray |
| 50 | Light ray | 50R | Light ray |
| 52 | Axis | 54 | Surface |
| 56 | Surface | 60 | Cover layer |
| 62 | Assembly | 64 | Die |
| 66 | Photodetectors | 68 | Color filters |
| 70 | Housing | 72 | Filter |
| 74 | Filter | 76 | Diffuser |
| 78 | Diffuser | 80 | Diffuser |
| 82 | Foam layer | 84 | Light sensor window |
| 84R; 84F | Ambient light sensor window | 90 | Printed circuit |
| 92 | Line | 94 | Direction |
| 96 | Line | 98 | Direction |
| 100 | Coating layer | 104 | Thinned area |
| 106 | Ambient light sensor assembly | A | Angle |
| AA | Active area | BT | Bottom openings |
| F | Front side | h | Height |
| IA | Inactive area | n | Normal |
| P | Pixels | R | Rear surface |
| T | Thickness | TP | Opening |

What is claimed is:

1. An electronic device comprising:
   a display having a brightness;
   an ambient light sensor configured to produce an ambient light measurement that is used to adjust the brightness of the display; and
   an opaque layer having a plurality of holes through which the ambient light sensor receives ambient light, wherein at least one of the plurality of holes has a tapered portion extending a first height and a non-tapered portion extending a second height different than the first height.

2. The electronic device of claim 1 further comprising a camera configured to capture an image.

3. The electronic device of claim 2 wherein the ambient light sensor and the camera are different types of optical sensors.

4. The electronic device of claim 1 further comprising at least one diffuser layer disposed between the opaque layer and the ambient light sensor.

5. The electronic device of claim 4 further comprising at least one infrared-light-blocking-and-ultraviolet-light-blocking filter disposed between the opaque layer and the ambient light sensor.

6. The electronic device of claim 1 further comprising at least one infrared-light-blocking-and-ultraviolet-light-blocking filter disposed between the opaque layer and the ambient light sensor.

7. The electronic device of claim 1 wherein the opaque layer has a thickness and wherein the non-tapered portion extends a height that is 5-15% of the thickness.

8. The electronic device of claim 1 wherein the opaque layer has a thickness and wherein the non-tapered portion extends a height that is less than 50% of the thickness.

9. The electronic device of claim 1 further comprising:
   a display cover layer overlapping display, wherein the opaque layer is formed on an inner surface of the display cover layer and wherein the ambient light sensor is mounted within an ambient light sensor assembly housing; and
   a compressible structure that biases the ambient light sensor assembly housing against the display cover layer.

10. The electronic device of claim 9 wherein the compressible structure comprises a layer of foam.

11. The electronic device of claim 9 wherein the compressible structure comprises a spring.

12. Apparatus comprising:
    a light sensor assembly housing;
    a light sensor mounted within the light sensor assembly housing; and
    an opaque layer having one or more holes through which the light sensor receives light, the opaque layer having a thickness and the one or more holes having a sidewall with tapered portions and non-tapered portions extending a height that is less than 50% of the thickness.

13. The apparatus of claim 12 wherein the non-tapered portions extend a height that is 5-15% of the thickness.

14. The apparatus of claim 12 further comprising a diffuser disposed over the light sensor within the light sensor assembly housing.

15. The apparatus of claim 12 wherein the light sensor comprises an ambient light sensor configured to detect ambient light intensity.

16. The apparatus of claim 12 wherein the one or more holes have outwardly facing openings of a first diameter and inwardly facing openings of a second diameter greater than the first diameter and non-overlapping with the outwardly facing openings.

17. The apparatus of claim 12 wherein the one or more holes have outwardly facing openings of a first diameter and inwardly facing openings of a second diameter greater than the first diameter and overlapping with the outwardly facing openings.

18. An electronic device comprising:
    an opaque layer having a locally thinned area and an opening in the locally thinned area; and
    an optical sensor assembly received within the opening and having an optical sensor configured to receive light through the opening in the opaque layer.

19. The electronic device of claim 18 further comprising an ultraviolet-light-absorbing member disposed over the optical sensor and is received in the opening of the opaque layer.

20. The electronic device of claim 19 further comprising a coating layer formed on the ultraviolet-light-absorbing member and having an appearance that is matched to the appearance of surrounding portions of the opaque layer.

21. The electronic device of claim 18 wherein the opaque layer comprises a metal housing wall.

22. The electronic device of claim 18 wherein the optical sensor assembly comprises a coating layer within the opening and disposed at an exterior surface of the electronic device.

* * * * *